UNITED STATES PATENT OFFICE.

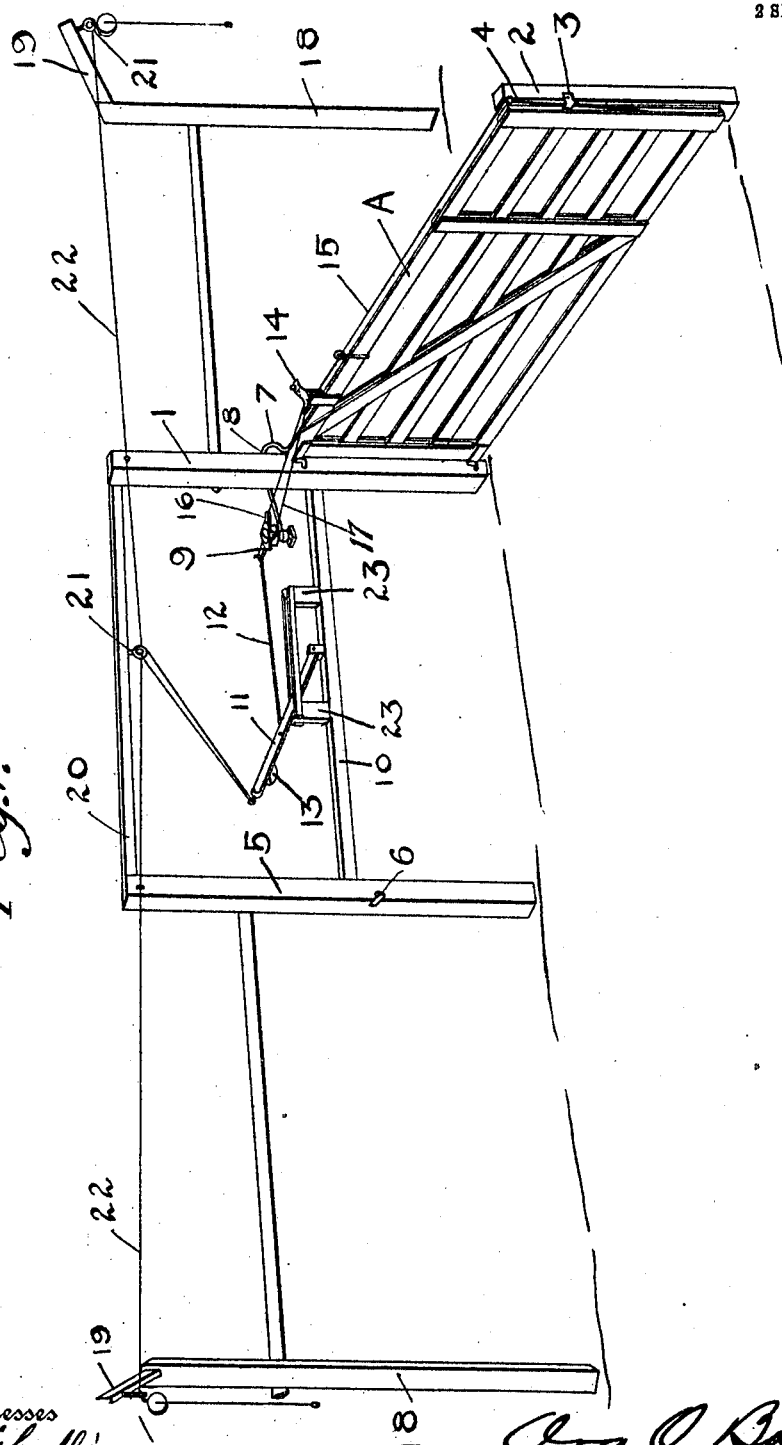

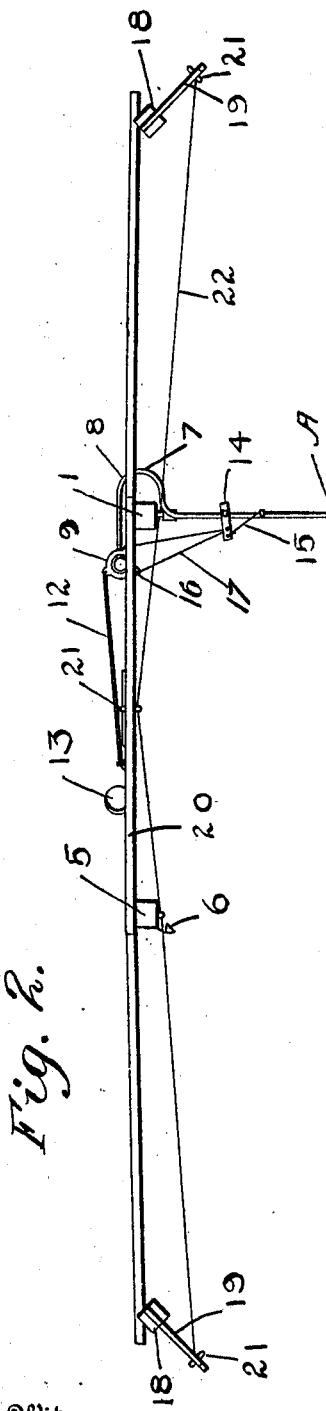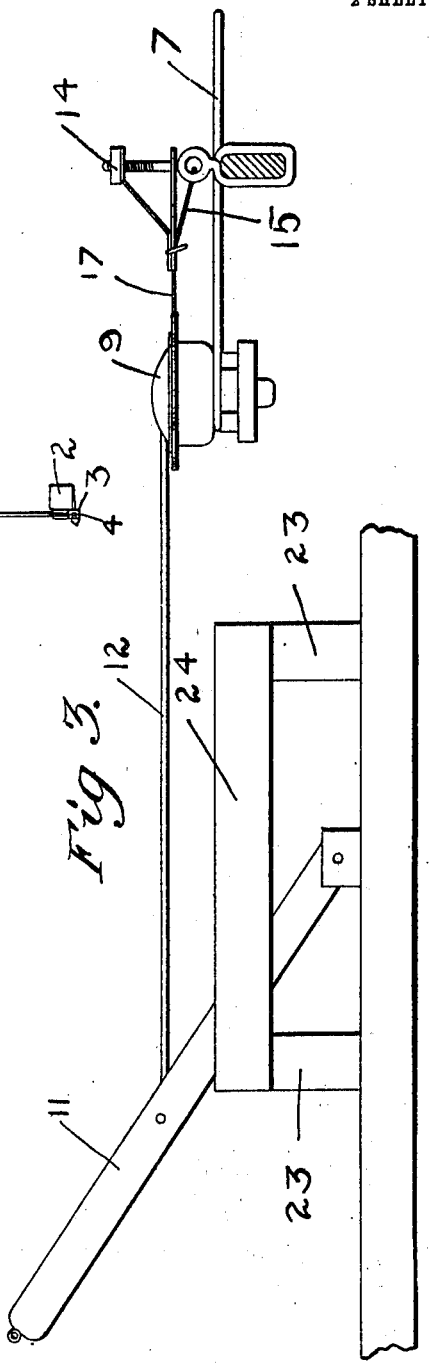

ORA O. BARTLOW, OF NEWMAN, ILLINOIS.

GATE-OPERATOR.

945,117.  Specification of Letters Patent.  Patented Jan. 4, 1910.

Application filed September 9, 1909. Serial No. 516,901.

*To all whom it may concern:*

Be it known that I, ORA O. BARTLOW, a citizen of the United States, residing at Newman, in the county of Douglas and State of Illinois, have invented certain new and useful Improvements in Gate-Operators, of which the following is a specification.

My invention relates to devices for opening and closing farm gates and has for its object the provision of a mechanism by which the gate may be operated from a distance each side of the gate, a single rope being used to each point, and secured to a weighted lever connected with the gate and a latch operating means so that when one of the ropes is pulled the latch is first unloosened and then the gate swung open. After passing through the gate the rope at the other side of the gate is pulled and the gate closed.

My invention will be described in detail hereinafter and illustrated in the accompanying drawings in which—

Figure 1 is a view in perspective showing the gate in a closed position, Fig. 2, a top plan view, and Fig. 3, a detail view of the lever mechanism for operating the latch and gate.

In the drawings similar reference characters indicate corresponding parts in the several views.

The gate A is hinged to post 1 while 2 indicates the latch post having the hook catch 3 secured thereto to engage the spring latch bar 4 secured near the lower edge of the free end of the gate.

5 indicates a post set at the same distance from post 1 as post 2 and having a hook catch 6 secured thereto to engage latch bar 4 when the gate is opened and hold it in an open position.

7 indicates a bar secured to the top of the gate A with its free end curved around post 1 as shown at 8 and having a lever 9 fulcrumed on its end.

10 indicates a bar connecting posts 1 and 5 and 11 a lever fulcrumed on the bar and connected to one arm of lever 9 by means of rod 12, the free end of said lever 11 being provided with a weight 13.

14 indicates an arm pivotally secured to the top of gate A and connected to the free end of spring latch bar 4 by means of rope or wire 15.

Lever 9 is provided with connections 16 spaced apart and 17 indicates flexible members, such as lengths of chain or rope connecting arm 14 and said connections 16.

18 indicates posts set at a distance on each side of gate A and having arms 19 extending outwardly therefrom.

20 indicates a bar connecting the tops of posts 1 and 5.

21 indicates pulleys secured to arms 19 and bar 20 and 22 ropes or other flexible members engaging said pulleys and secured to the free end of lever 11, each of said flexible members being, as shown, extended from one or the other of the posts 18 and passing over one of the pulleys 21 on bar 20 is secured to the lever 11 as stated.

In operation it will be apparent that when either of the ropes 22 is pulled the lever 11 will be swung upwardly until it reaches perpendicular when its momentum will carry it past the perpendicular and the weight 13 will cause it to swing to its lowermost position resting on one or the other uprights 23 of guide 24. During this operation of the lever 11 the lever 9 will be swung by connecting bar 10 and through the instrumentality of one or the other of the ropes or wires 15 the arm 14 will be swung back and the latch bar 4 will be moved out of engagement with hook catch 3 or 6 as the case may be and the gate will be opened or closed.

It will be understood from an inspection of the drawings that the gate may be opened or closed by pulling downwardly on either rope 22 and, after opening or closing, the gate may be returned to its original position by pulling the same rope or the other as desired.

Having thus described my invention what I claim is—

A gate operator comprising a hinge post, a gate mounted to swing on said hinge post, a latch post at the opposite side of the gate opening, a latch hook secured to said latch post, another post at a distance from the hinge post to engage the gate when open, a latch hook secured to the last mentioned post, horizontal bars connecting the hinge post and the last mentioned latch post, a weighted lever fulcrumed on the lowermost horizontal bar, pulleys secured to the uppermost bar, posts set at a distance from the hinge post and the last mentioned latch post, pulleys secured to said distance posts, a flexible member secured to said weighted lever, engaging the pulleys aforesaid and ending at each distance post, a spring latch bar secured to the gate and adapted to engage the latch hooks aforesaid, an arm pivotally secured to the gate, a flexible member engaging the arm and latch bar, a bar secured to the gate and bent around the hinge post, a lever fulcrumed on the end of said bar and having two connections on one end, flexible members connecting the pivoted arm on the gate and the two connections on the lever, and a rod connecting the free arm of the lever and the weighted lever aforesaid.

In testimony whereof I hereto affix my signature in the presence of two witnesses.

ORA O. BARTLOW.

Witnesses:
C. E. DOUGLASS,
JAY I. BURGETT.